(12) United States Patent
Paintendre

(10) Patent No.: US 11,254,472 B2
(45) Date of Patent: Feb. 22, 2022

(54) SMART CAPSULES

(71) Applicant: Amcor Flexibles Capsule France, Paris la Defense (FR)

(72) Inventor: Johann Paintendre, Izon (FR)

(73) Assignee: Amcor Flexibles Capsules France

( * ) Notice: Subject to any disclaimer, the term of this patent is extended or adjusted under 35 U.S.C. 154(b) by 26 days.

(21) Appl. No.: 16/313,787

(22) PCT Filed: Jun. 27, 2017

(86) PCT No.: PCT/EP2017/025184
§ 371 (c)(1),
(2) Date: Dec. 27, 2018

(87) PCT Pub. No.: WO2018/001572
PCT Pub. Date: Jan. 4, 2018

(65) Prior Publication Data
US 2019/0315525 A1   Oct. 17, 2019

(30) Foreign Application Priority Data

Jun. 27, 2016  (EP) .................................... 16020251

(51) Int. Cl.
*B65D 41/44* (2006.01)
*B65D 51/24* (2006.01)
*G06K 19/077* (2006.01)

(52) U.S. Cl.
CPC .......... *B65D 41/44* (2013.01); *B65D 51/245* (2013.01); *G06K 19/07798* (2013.01); *B65D 2203/10* (2013.01); *B65D 2401/20* (2020.05); *B65D 2401/25* (2020.05)

(58) Field of Classification Search
CPC .. B65D 41/44; B65D 51/245; B65D 2401/25; B65D 2401/20; B65D 2203/10; G06K 19/07798
USPC ......................................................... 215/252
See application file for complete search history.

(56) References Cited

U.S. PATENT DOCUMENTS

| 10,399,753 | B1 * | 9/2019 | Migas ................ B65D 41/3447 |
| 2004/0066296 | A1 | 4/2004 | Atherton |
| 2005/0162277 | A1 | 7/2005 | Teplitxky et al. |
| 2006/0139173 | A1 * | 6/2006 | Fang ................ G06K 19/07749 340/572.7 |
| 2006/0283829 | A1 * | 12/2006 | Dubs ...................... B65D 41/46 215/252 |
| 2010/0141384 | A1 * | 6/2010 | Chen .................... H04B 5/0062 340/10.1 |

(Continued)

FOREIGN PATENT DOCUMENTS

| EP | 2960834 A1 | 12/2015 |
| EP | 2991001 A1 | 3/2016 |

(Continued)

*Primary Examiner* — J. Gregory Pickett
*Assistant Examiner* — Niki M Eloshway

(57) ABSTRACT

The technology relates to a cap 1 having a head 4 and a skirt 7 with a circumferential opening area 20 characterized in that the cap 1 may include a transponder 10 including and antenna circuit 14 and a leg circuit 17 the leg circuit 17 extending to the skirt 7 and being non-releasably affixed to the opening area 20, whereby the leg circuit 17 is breakable by disruption of the opening area 20. The transponder 10 stores and is able to transmit information on the integrity of the cap 1 to a reading device.

5 Claims, 3 Drawing Sheets

(56) References Cited

U.S. PATENT DOCUMENTS

| | | | |
|---|---|---|---|
| 2015/0353234 A1 | 12/2015 | Yagishita et al. | |
| 2016/0110725 A1* | 4/2016 | Bright | A61J 1/00 705/318 |
| 2017/0345269 A1* | 11/2017 | Schomacker | G09F 3/0376 |
| 2018/0137533 A1* | 5/2018 | Pilarz | G06K 19/07709 |
| 2018/0201414 A1* | 7/2018 | Rouquette | B65D 41/3442 |
| 2018/0311111 A1* | 11/2018 | Knobel | B65D 50/066 |
| 2019/0205715 A1* | 7/2019 | Kato | G06K 19/07798 |
| 2019/0382173 A1* | 12/2019 | Knight | H04W 4/80 |

FOREIGN PATENT DOCUMENTS

| | | |
|---|---|---|
| FR | 1191958 A | 10/1959 |
| JP | 2011213378 A | 10/2011 |
| JP | 2014012560 A2 | 1/2014 |
| JP | 2014114070 A | 6/2014 |
| WO | 2014116599 A1 | 7/2014 |

* cited by examiner

SMART CAPSULES

CROSS REFERENCE TO RELATED APPLICATIONS

This application claims the benefit of the priority filing date of PCT Patent application Serial No. PCT/EP2017/025184, titled "SMART CAPSULES," which has a priority filing date of Jun. 27, 2016 and which includes the same inventor(s). That application is hereby incorporated by reference as if fully set forth herein.

FIELD OF THE TECHNOLOGY

The technology relates to capsules for receptacles and bottles containing wines and spirits or alcoholic beverages in general. In particular, it relates to capsules that include anti-counterfeiting features.

BACKGROUND OF THE TECHNOLOGY

Some products quickly deteriorate once the bottle or package has been opened. Thus, many manufacturers include labels and devices warning a consumer if a package has been opened. For example, a simple system for foods in glass jars that are sealed under vacuum by their tops include a warning label to check the condition of the metal lid top as this top bubbles downwards as long as the vacuum is maintained. Once the jar is opened, the vacuum is lost and the top bubbles upwards and no longer downwards.

Product counterfeiting presents a further difficult situation for the customer and the manufacturer. In particular, more expensive products make it attractive for counterfeiters to exactly duplicate the packaging and all associated seals and security devices. As a result, on one hand the consumer runs the risk to purchase an imitated product of lower quality or a product not meeting the specified properties at all. On the other hand, the manufacturer suffers losses from lower sales and also runs the risk to have its goodwill and good reputation hampered through counterfeited products.

Therefore, many expensive products are subject to tampering or counterfeiting in the marketplace. Wines and high-end spirits are particularly susceptible to such activities, as the goods often have high value, and such tampering or counterfeiting may be difficult to detect. Tampering and counterfeiting can become a significant commercial issue, resulting in loss of revenue, reduced consumer confidence in product quality and authenticity, as well as impairment to brand value. Due to their high cost and reliance on consumer goodwill, wine and spirit products are also particularly sensitive to negative market effects that may be caused by product tampering and counterfeiting. In addition, there is also a growing need to include and communicate further information related with a particular product, e.g., information on the manufacturer, the brand in general or in a further aspect tracking information about the product from its production to the end consumer.

US 2005/0162277 describe a product security system including an RFID chip and an antenna polymerized onto separable parts of a product package. When the package is opened, the antenna is damaged and electronic access to the RFID chip is impossible.

Many of the available product security and authentication systems rely in one way or the other on the destruction of the RFID chip, its antenna or both when the package is opened for the first time or tampered with. That means, these systems do not provide for and allow the transmission of more complex information and continued exchange of information once the package has been accessed for the first time. As the RFID chip or one of its essential parts is destroyed, no further access is possible and no further information may be retrieved.

BRIEF SUMMARY OF THE TECHNOLOGY

The disclosed technology may provide a simple but reliable security function that evidences tampering. It may further provide continued accessibility of the information including security information of the tampering detection system.

A cap according to the disclosed technology may provide a head and a skirt. The skirt may include a circumferential opening area. The cap may also include a transponder which includes an antenna circuit and a leg circuit, whereby the leg circuit extends to the skirt and is non-releasably affixed to the opening area, whereby the leg circuit is breakable by disruption of the opening area.

The circumferential opening area may be formed in different ways. It may be a defined area on the skirt that can be removed, such as a tear band. The opening area may also be a defined area on the skirt which is disrupted by cutting it with a knife.

The opening area may also include a circumferential perforation on the skirt arranged approximately in the middle of the skirt's longitudinal extension. The opening area, i.e. the circumferential perforation may also be arranged at another distance on the skirt in relation to the head portion of the cap.

Therefore, the opening area on the skirt designates an area of the skirt where a structural separation of a lower portion of the skirt from an upper portion of the skirt can be achieved, whereby the upper portion of the skirt is the portion of the skirt adjacent to the head part of the cap. Thus, the opening area functions as a structural fuse between the upper portion of the skirt and the lower portion of the skirt. The structural fuse, i.e. its function, may be achieved in various ways, such as by way of a circumferential tear band, one or more perforations or lines of weakness or a simple cut made with a knife along the opening area. Upon disruption of the opening area or structural fuse, one or more leg circuits which extend at least to, preferably beyond the opening area or structural fuse of the skirt, and which are non-releasably affixed to the opening area, are also disrupted. The leg circuit is a part of the circuitry of the transponder and is different from an antenna circuit. The antenna circuit is preferably arranged in the head portion of the cap. Thus, even after disruption of the at least one leg circuit the transponder is not severed and remains functional. The at least one leg circuit serves as a switch that alters the information that may be retrieved from the transponder. The altered information may for instance indicate that the opening area or structural fuse has been broken. Since the information is altered by disrupting the at least one leg circuit, attempts to restore the leg circuit will not reverse the altered information. The leg circuit serves in this respect as a onetime switch reliably evidencing tampering with. The at least one leg circuit is preferably arranged on the inside of the skirt which means the leg circuit is arranged between the skirt and a side wall of a container when the cap closes the container.

The skirt can be made of different materials. It may be made of metal. However, it may also include different kinds of laminates, for instance a laminate including one or more plastics layers and one or more layers of metal. Laminates including one or more plastics layers and at least one metalized plastics layer are also conceivable.

A leg circuit is a part of the circuitry of the transponder. The leg circuit designates a part of a circuitry which is elongated and extends away from the rest of the circuitry. It has preferably the form of a needle-shaped loop but it may also have another shape such as an oval or the like. The leg circuit extends to a part of the cap beyond the position of the transponder, if as an example the transponder is positioned in the head of the cap, the leg circuit extends to at least the part of the skirt of the cap which includes an opening area. The leg circuit is non-releasably affixed to the opening area, that is, the leg circuit is attached to the opening area in a way that it cannot be separated from the opening area without being broken. The leg circuit has the function of switch as the breaking of the leg circuit alters the information that can be retrieved from the transponder. In addition, this functioning as a switch of a specific leg circuit can be triggered only once because after the breaking of a specific leg circuit said leg circuit becomes irreversibly damaged.

In one or more embodiments, the cap may include a head and a metal skirt. The metal skirt may include a circumferential tear band, delimited by two weakening lines. The head may include a near field communication chip (NFC chip), which may include an antenna circuit and a leg circuit. The leg circuit extends to the metal skirt across the circumferential tear band, and may be delimited by two weakening lines. The leg circuit is non-releasably affixed to the tear band and the leg circuit is breakable by removal of the tear band.

The NFC chip is arranged either on the outside or the inside of the head. The only part of the NFC chip which extends to the metal skirt is the leg circuit. Of course, as the leg circuit is an electrically conducting part of the NFC chip it is affixed to the metal skirt in an electrically isolated way in order to prevent any unwanted shortcuts. The NFC chip may itself be arranged on substrate providing some protection to the NFC chip and its circuitry and to provide more mechanical stability of the chip. The NFC chip arranged on such a substrate forms an NFC tag which is the arranged on the outside or the inside of the head of the cap.

The leg circuit of the NFC chip may be securely, i.e., non-releasably affixed to the tear band in order to achieve a reliable interruption of the electrical circuit upon removal of the circumferential tear tab. The leg circuit as a whole is advantageously non-releasably affixed to the metal skirt. If the NFC chip, its antenna circuit and the leg circuit is arranged on substrate forming a NFC tag, said NFC tag may be affixed to the cap for example by means of a permanent adhesive. The part of the NFC tag including the NFC chip and the antenna circuit is arranged on the outer or the inner side of the head of the cap. The part of the NFC tag which includes the leg circuit extending to the metal skirt is consequently arranged on the outer side or the inner side of the metal skirt as well.

In addition, the NFC chip or the NFC tag may include more than one leg circuit. It may include for instance two, three, four or even more leg circuits. These leg circuits are preferably evenly distributed around the metal skirt. If there are four leg circuits this provides a leg circuit at every 90° of the circumferential tear band. In case of eight leg circuits the angle between the evenly distributed leg circuits is 45°. This allows a much more differentiated determination on the scope of the manipulation of the tear band based on the number of broken leg circuits.

The NFC chip allows the transmission of more detailed information. For instance, the chip may store information on the manufacturer that can be retrieved by an end consumer. It may further provide information on the authenticity of the product and warn the end consumer if the tear band has been tampered with at some point before the purchase. In addition, the product can be precisely tracked throughout its entire life cycle. It may further store information useful for customer relationship management, e.g. a competition.

In one or more embodiments, the head of the cap may be made of a plastics material. The plastics material is transparent to radio frequencies in the MHz range. Advantageously, the material is transparent to radio frequencies in the range of 13 MHz to 14 MHz, preferably to 13.56 MHz. This allows the arrangement of the NFC chip including the antenna circuit on the inside of the head of the cap.

In one or more embodiments, the NFC chip including the antenna circuit is arranged on the inside. In this case the head of the cap may be made of a plastics material as these materials are transparent to radio frequencies in the MHz range as described above. This provides for a protection of the NFC chip and its circuitry from mechanical damage due to improper handling.

In one or more embodiments of the cap the NFC chip including the antenna circuit is arranged on the outer side of the cap. In such an arrangement, the head of the cap may also be made of metal, preferably of the same metal or metal alloy as the skirt of the cap. As the NFC chip including its antenna circuit is arranged on the outer side of the cap, the material of the cap, i.e., the metal does not compromise or even prevent the emission of radio waves. The NFC chip and its circuitry are arranged on the outer side of the cap in way they are electrically isolated.

If the NFC chip and the antenna are arranged on the outer side of the cap the metal the head of the cap is made of is preferably selected from aluminium, aluminium alloys, tin, and tin alloys.

The metal skirt of the cap is preferably also made of a metal selected from aluminium, aluminium alloys, tin, and tin alloys.

The NFC chip including the antenna circuit which is arranged on the outer side of the cap is preferably covered by a top layer which is transparent to radio frequencies in the MHz range. Preferably, the top layer is made of a plastic material. The top layer provides mechanical protection of the NFC chip and the antenna circuit without interrupting communication of the NFC chip with suitable reading devices.

In one or more embodiments, the NFC chip transmits information on the integrity of the cap in the state of unbroken leg circuit to a reading device. This means the NFC chip transmits the information that the cap, in particular the tear band has not been manipulated, that the cap has not been opened until the time of reading this status information. Thus, the NFC chip may transmit information that the cap has not been tampered with and thereby serves as an integrity tag.

Advantageously, the reading device is a handheld device capable of communicating with NFC chips. (e.g. cellular phones capable of NFC communication).

In one or more embodiments, a bottle includes a cap according to the disclosed technology.

BRIEF DESCRIPTION OF THE DRAWINGS

The cap according to the disclosed technology is explained in more detail below with reference to exemplary embodiments in the drawings, in which, purely schematically.

DETAILED DESCRIPTION OF THE TECHNOLOGY

Figure 1:
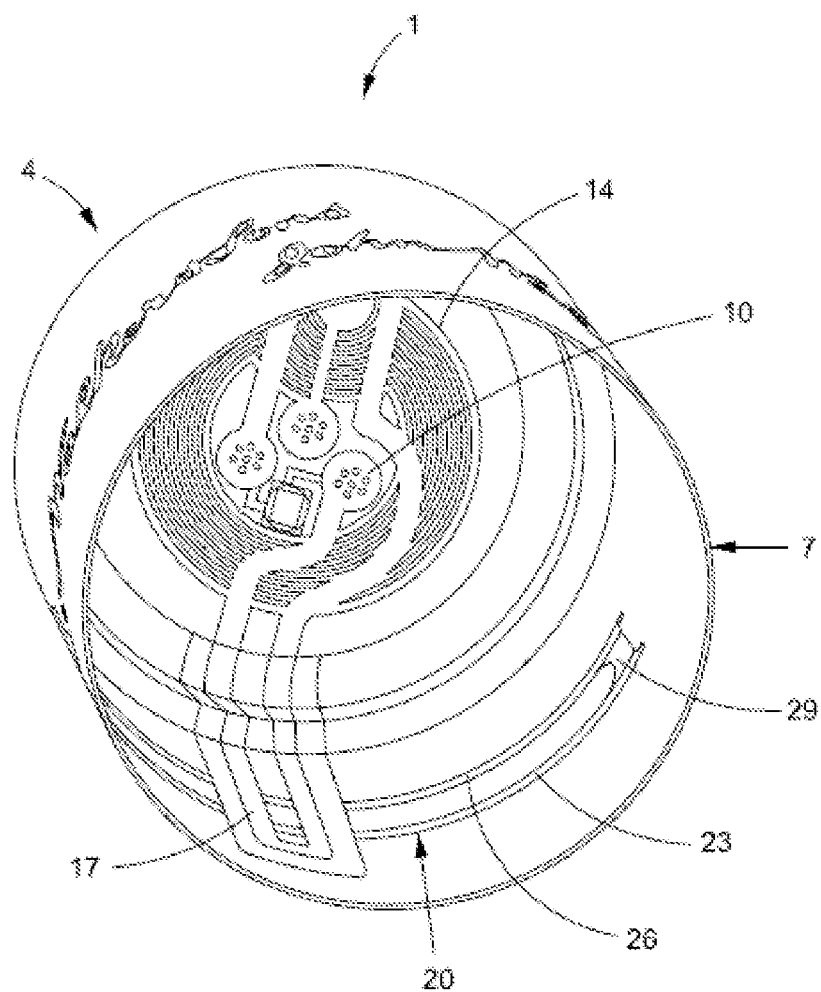
FIG. 1 shows a first perspective view from a cap.

FIG. 1 shows a first perspective view of a cap 1 according to the disclosed technology. The cap 1 includes a head 4 and a metal skirt 7. As most of the inner side of the cap 1 is visible the NFC chip 10 including the antenna circuit 14 arranged on the planar part of the head 4 is shown. Further shown is a leg circuit 17 which extends from the NFC chip 10 to the inner side of the metal skirt 7 across the tear band 20. The tear band 20 is delimited by two weakening lines 23 and 26. The tear band 20 may further include a grip tab 29.

Figure 2:
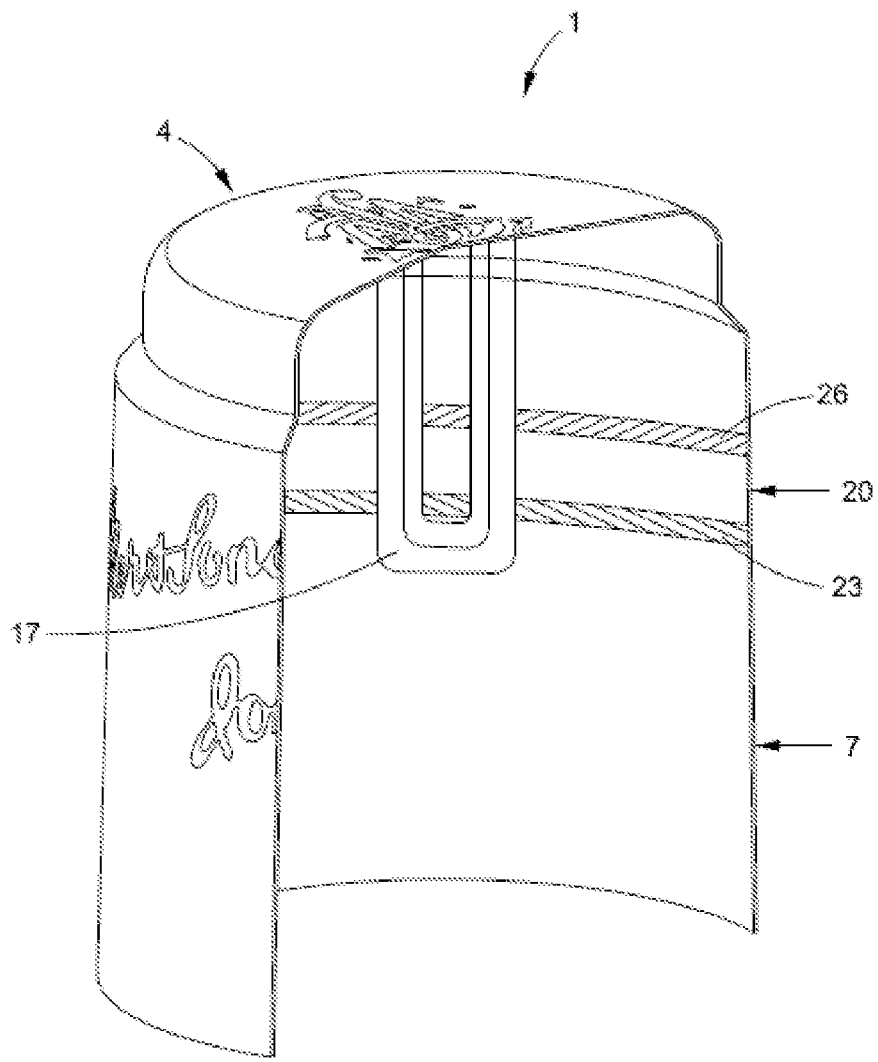
FIG. 2 shows a second perspective view from a cap.

FIG. 2 shows a perspective view of a cross section of a cap 1. Again, the cap 1 includes a head 4 and a substantially cylindrical skirt 7. The circumferential tear band 20 that is delimited by two weakening lines 23 and 26 is only partially visible. The portion of the leg circuit 17 which is shown extends to the metal skirt 7 and further across the tear band 20.

Figure 3:
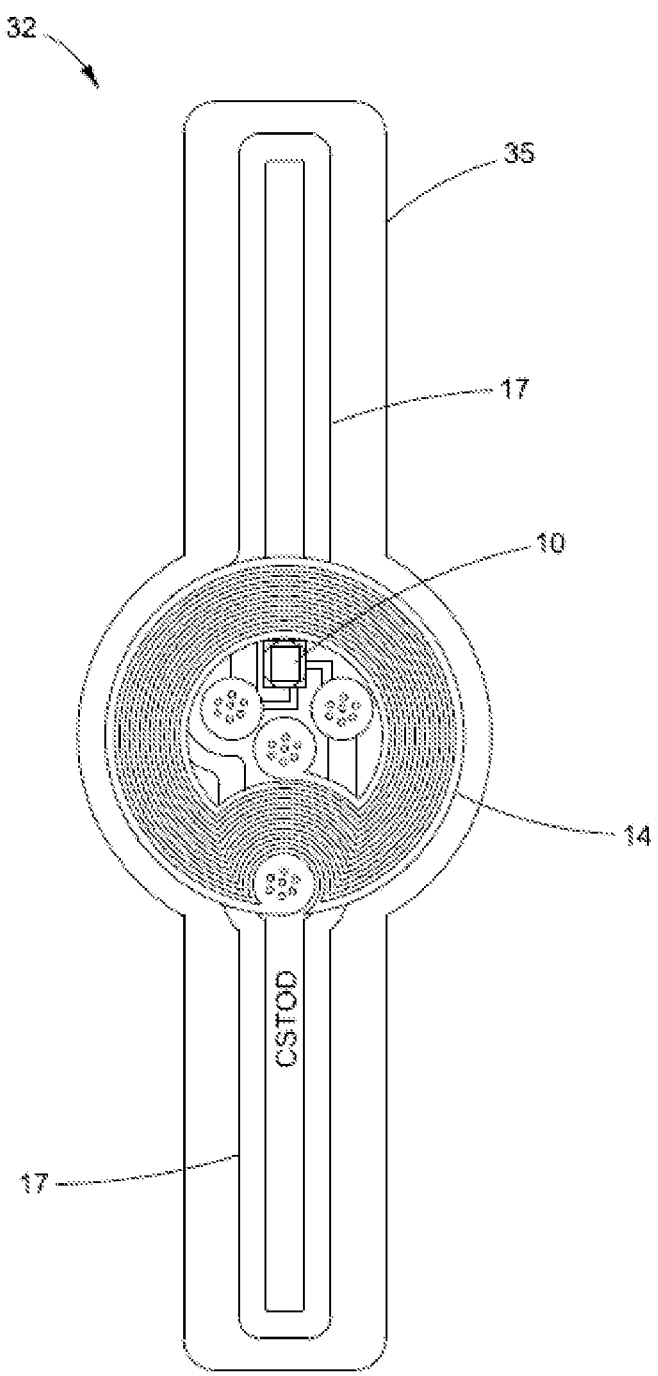
FIG. 3 shows a NFC tag.

FIG. 3 shows a NFC tag 32. The NFC chip 10 including its antenna circuit 14 and the two leg circuits 17 are securely arranged on a substrate 35 by means of a permanent adhesive.

The invention claimed is:

1. A cap comprising a head and a skirt comprising a circumferential opening area; wherein the head and the skirt comprise metal, wherein the circumferential opening area comprises a circumferential tear band that is delimited by two weakening lines, wherein the cap comprises a transponder including an antenna circuit and a leg circuit, wherein the leg circuit is different from the antenna circuit, wherein the leg circuit extends to the skirt across the circumferential tear band, wherein the leg circuit is non-releasably affixed to the circumferential tear band, wherein the head comprises an NFC chip including the antenna circuit, wherein the cap has an outer side and the transponder is arranged on the outer side of the cap, wherein the NFC chip including the antenna circuit arranged on the outer side of the cap is covered by a top layer comprising a plastic material that is transparent to radio frequencies in the MHz range, wherein the leg circuit is breakable by disruption of the opening area, and wherein the breakage of the leg circuit alters information retrieved from the transponder.

2. A cap according to claim 1, wherein the metal is selected from the group consisting of aluminium, aluminium alloys, tin, and tin alloys.

3. A cap according to claim 1, wherein the transponder transmits information on an integrity of the cap in a state of unbroken leg circuit to a reading device.

4. A cap according to claim 3 wherein the reading device is a handheld device.

5. A cap according to claim 1, further including a bottle wherein the cap is affixed to the bottle.

* * * * *